United States Patent [19]

Reed et al.

[11] Patent Number: 5,002,291
[45] Date of Patent: Mar. 26, 1991

[54] HYDRAULICALLY OPERATED CHUCK CLOSING MECHANISM

[75] Inventors: Charles F. Reed, Fairport; Valery Parker, Pittsford, both of N.Y.

[73] Assignee: Dover Industries, Inc., Chicago, Ill.

[21] Appl. No.: 498,645

[22] Filed: Mar. 26, 1990

[51] Int. Cl.$^5$ ............................................. B23B 31/20
[52] U.S. Cl. ........................................ 279/4; 279/50; 279/43; 279/1 W
[58] Field of Search ................. 409/233; 279/1 W, 4, 279/43, 50, 57, 51, 58, 65, 74, 82

[56] References Cited

U.S. PATENT DOCUMENTS 4,615,101 10/1986 Edwards et al. ............... 279/50 X
4,799,696 1/1989 Reed et al. ..................... 279/43 X

FOREIGN PATENT DOCUMENTS 213075  3/1987 European Pat. Off. ............. 279/4
2835965 2/1980 Fed. Rep. of Germany .... 279/1 W
3512890 10/1986 Fed. Rep. of Germany .......... 279/4
199308  9/1987 Japan ................................. 409/233

Primary Examiner—Larry I. Schwartz
Assistant Examiner—R. Schultz
Attorney, Agent, or Firm—Shlesinger, Fitzsimmons & Shlesinger

[57] ABSTRACT

In an automatic screw machine two spindles are mounted coaxially one within the other and are keyed together for rotation in unison in the indexing head of the machine. The inner spindle has a collet on one end thereof; the outer spindle is shiftable axially relative to the inner spindle between collet opening and closing positions. A spring, which surrounds the inner spindle at one end thereof, urges a washer on the inner spindle against one end of the outer spindle normally to urge the outer spindle resiliently into a collet closing position. A hydraulic cylinder, which surrounds the outer spindle at the side of washer remote from the spring, contains a piston which is engaged at one side with the washer and at its opposite side communicates with a fluid pressure chamber. To open the collet pressure is applied to the fluid in the chamber, thereby causing the piston to compress the spring and to permit the outer spindle to move to a collet opening position.

4 Claims, 1 Drawing Sheet

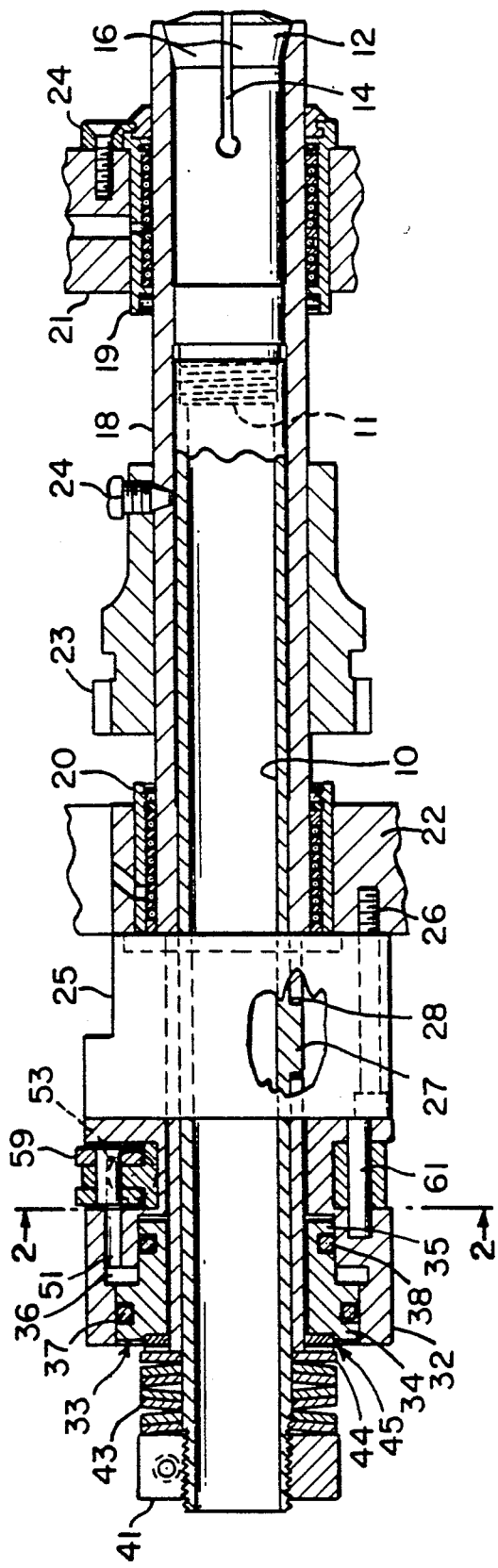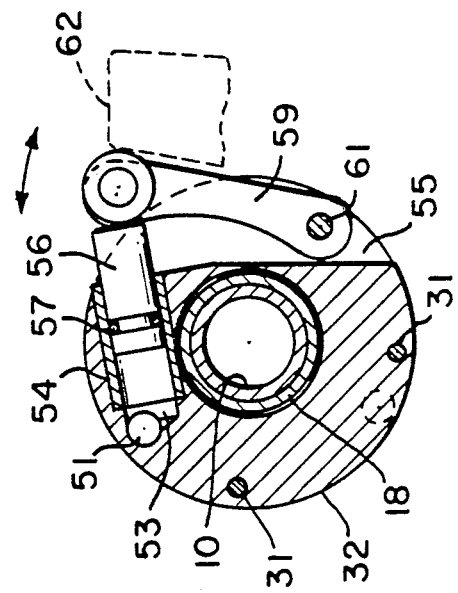
FIG. 1
FIG. 2

HYDRAULICALLY OPERATED CHUCK CLOSING MECHANISM

BACKGROUND OF THE INVENTION

This invention relates to a chuck closing mechanism, and more particularly to an improved, hydraulically operated chuck closing mechanism that is particularly adapted for use with automatic screw machines.

U.S. Pat. No. 4,799,696, which is assigned to the same company as the present application, discloses a chuck closing mechanism which is particularly suitable for use with an automatic screw machine. That particular mechanism utilizes a mechanically operated camming device for selectively opening and closing a tubular collet through the bore of which bar stock is intermittently advanced into registry with associated cutting tools on the machine. The collet is attached to the forward end of an inner tubular spindle, which is fixed coaxially within, but which rotates with an outer spindle. The outer spindle is reciprocable relative to the inner spindle, and selectively into and out of a collet closing position in which its forward end advances over the collet to force the collet teeth radially inwardly to a closed position around a piece of bar stock.

Chuck closing mechanisms of the type disclosed in the above-noted U.S. Pat. No. 4,799,696 are very effective, but are rather noisy in operation and are subject to wear after repeated use. Applicants have discovered that objectionable noise and wear can be minimized, if not eliminated, by utilizing a hydraulically operated device for opening and closing the associated collet, rather than a cam-operated device.

Heretofore efforts have been made to operate chuck closing mechanisms hydraulically. U.S. Pat. No. 3,168,322, for example, discloses a spring-loaded draw bar which functions normally to retain an associated collet chuck in a closed or tool-gripping position. To release the collet rotation of the draw bar must be stopped, after which hydraulic fluid under pressure is supplied to a chamber to cause the draw bar to be retracted against the resistance of the collet-closing spring mechanism. A major problem with this mechanism, however, is that it is not suitable for feeding bar stock. Instead, it is directed to a removable collet designed especially for holding a tool or tool holder having thereon specially shaped keyways and annular rib means, which cooperate with corresponding keys and rib means formed on the collet holder, and the inner peripheral surface of the collet itself. It is therefore impossible to feed bar stock through the draw bar that manipulates the collet closing head.

In contrast to the apparatus disclosed in U.S. Pat. No 3,168,322 the automatic screw machine to which the chuck closing mechanism of this invention as related, utilizes a collet which is designed to feed bar stock through its bore, and which is operable even while being rotated about its axis.

Accordingly, it is an object of this invention to provide for a multiple spindle screw machine an improved, hydraulically operated chuck closing mechanism which is very quiet during operation, and which tends to show very little wear during prolonged use.

Still another object of this invention is to provide for a machine of the type described, an improved chuck closing mechanism which is relatively simple to operate and inexpensive to produce, as compared to prior such devices.

Other objects of the invention will be apparent hereinafter from the specification and from the recital of the appended claims, particularly when read in conjunction with the accompanying drawing.

SUMMARY OF THE INVENTION

Two spindles are disposed coaxially one within the other, and with the outer spindle journaled in the indexing head of an automatic screw machine for rotation in unison with the inner spindle, and for limited axial movement relative thereto selectively to open or close a collet which is mounted on one end of the inner spindle. A compression spring, which surrounds the opposite end of the inner spindle, urges a washer on the inner spindle against the adjacent end of the outer spindle normally to retain the outer spindle in the collet closing position.

Surrounding the outer spindle at the side of the spring-loaded washer remote from the compression spring is a hydraulic cylinder containing a first piston which is engaged at its outer end with the spring-loaded washer. The inner end of the first piston faces one end of a fluid chamber, the opposite end of which communicates with the inner end of another or second piston having an outer end that is engaged with a pivotal operating rod on the machine.

In order to open the collet, the operating rod forces the second piston inwardly of its associated bore to force hydraulic fluid in said chamber toward the first piston, which therefore is shifted outwardly of its surrounding cylinder bore and against the spring-loaded washer, whereby the latter is shifted axially against the resistance of the spring to a collet opening position. When the second piston is permitted to return to its initial position, the spring returns the outer spindle to its collet closing position.

THE DRAWINGS

FIG. 1 is a fragmentary longitudinal sectional view of an improved chuck closing mechanism for a multiple spindle screw machine made according to one embodiment of this invention, with portions of the mechanism being shown in full; and FIG. 2 is a fragmentary sectional view taken generally along the line 2—2 in FIG. 1 looking in the direction of the arrows, and with a portion of the machine shown in phantom by broken lines.

PREFERRED EMBODIMENTS OF THE INVENTION

Referring now to the drawing by numerals of reference, 10 denotes an inner, tubular, collet-supporting spindle 10 having an internally threaded forward end in which is secured the externally threaded rear end 11 of a conventional, flexible collet or collet chuck 12. Collet 12 has in its forward end a plurality of equally-angularly spaced, axially extending slots 14, which form on the forward end of the collet a plurality of integral gripping finger 16. Spindle 10 and its collet 12 are mounted coaxially within the bore of an outer, collet-closing spindle or sleeve 18. Spindle 18 is mounted intermediate its ends for rotational and limited axial movement in a pair of annular roller bearing housings 19 and 20, which are secured in registering openings formed in a pair of spaced walls 21 and 22, respectively, of the spindle indexing head of a conventional automatic screw machine. The outer spindle 18 is adapted to be rotated in known manner by a gear 23, which surrounds spindle 18 between the walls 21 and 22, and which has its hub portion fastened to the spindle 18 by one or more screws 24.

The front bearing 19 is secured in the machine wall 21 by a cap 24, and communicates intermediate its ends with the lower end of a port which is formed in wall 21 to permit lubrication of the bearing 19. Bearing 20, on the other hand, is secured in the machine wall 22 by a bearing retainer 25, which is secured over the left end of bearing 20 as shown in FIG. 1, by a series of bolts 26, only one of which is shown in FIG. 1. The spindles 10 and 18 pass coaxially through the retainer 25 and are connected therein for rotation together by a key 27, which projects from the periphery of spindle 10 through an elongate slot 28 in the outer spindle 18.

Secured by a plurality of screws 31 (FIG. 2) to the end of retainer 25 remote from the wall 22, and surrounding spindles 10 and 18 adjacent the rear or left ends thereof in FIG. 1, is an annular cylinder housing 32. Mounted for limited axial reciprocation in the outer left end of housing 32 coaxially thereof is a tubular piston, which is denoted generally by the numeral 33. Piston 33 has on one end thereof, the left end as shown in FIG. 1, an enlarged-diameter section 34, which is mounted for axial sliding movement in a first counterbore in housing 32, and has on its opposite end a reduced-diameter section 35, which is axially slidable in a second, slightly smaller counterbore formed in housing 32 intermediate its ends. As shown more clearly in FIG. 1, an enlarged-diameter annular chamber 36 is formed in housing 32 between the two counterbores in which the sections 34 and 35 of the piston reciprocate. To seal opposite ends of chamber 36 the piston sections 34 and 35 have secured in annular recesses in the outer peripheral surfaces thereof flexible O-rings 37 and 38, respectively, which sealingly engage the walls of the surrounding counterbores.

Also as shown in FIG. 1, the outer spindle 18 extends coaxially through housing 32 and the piston 33, but only part way beyond the left end of the piston as shown in FIG. 1; while the inner spindle 10 extends coaxially beyond the left end of spindle 18 and has threaded on its left end (FIG. 1) a stop nut 41. Surrounding the inner spindle 10 between nut 41 and the cylinder housing 32 is a compression spring 43. Spring 43 is seated at one end against the nut 41, and at its opposite end against one side of a washer 44 which surrounds and is axially slidable on spindle 10. At its opposite side washer 44 engages an annular thrust bearing 45, which surrounds the left end of the outer spindle 18 between washer 44 and the piston 33. Also, washer 44 is engaged adjacent its inner peripheral surface with the inner, terminal end of spindle 18 (left end in FIG. 1) so that spring 43 normally urges washer 44, and hence the outer spindle 18, resiliently toward the right in FIG. 1 relative to the inner spindle 10, or into a collet closing position as shown in FIG. 1.

In order selectively to open the collet 12, or in other words to permit spindle 18 to shift toward the left in FIG. 1 relative to the inner spindle 10, the fluid chamber 36 (FIG. 1) opens at one end on an axially extending canal or port 51, which is formed in the cylinder housing 32 to open at one end at chamber 36 and at its opposite end on another, cylindrically shaped piston chamber 53 (FIG. 2), which is formed in the annular wall of housing 32 adjacent the inner end thereof to extend transversely of the axis of the housing. As shown more clearly in FIG. 2, chamber 53 extends nearly tangentially of the bore in housing 32, and has fixed therein a sleeve 54, which opens at its inner end on chamber 53, and at its outer end on a chordal slot or groove 55, which is formed at one side of the housing 32 adjacent its inner end. A second piston or plunger 56, which is mounted to reciprocate in the bore of sleeve 54, is surrounded intermediate its ends by a resilient O ring 57, and projects at its outer end out of sleeve 54 and into engagement with one end of a pivotal push lever, or operating lever 59. At its opposite end lever 59 is mounted to pivot about a pin 61, which is secured at opposite ends thereof in housing 32 to extend transversely across, or between opposite sides of, the housing groove 55. At the side thereof opposite the piston 56, the upper or free end of lever 59, as shown in FIG. 2, is engaged by an operating cam 62, which is controlled by means on the multiple spindle machine which form no part of this invention.

In use, the space between the two pistons 33 and 56—i.e., the space defined by chamber 36, the port 51, the chamber 53 and the bore in the inner end of sleeve 54—is filled with a hydraulic fluid. Also, normally, the operating lever 59 on the machine is disposed in its clockwise limit position about pin 61 thereby, in effect, removing pressure from the piston 56. Normally, therefore, the spring 43 will be in an expanded position in which it will have urged the outer spindle 18, via the washer 44, axially toward the right in FIG. 1 relative to the inner spindle 10, and into a collet closing position. At this time, therefore, the piston 33 will have been urged by the spring 43, via the washer 44 and thrust bearing 45, to its innermost position relative to the housing 32, and the pressure thereby applied through the hydraulic fluid to the piston 56 will have urged piston 56 into its outermost position relative to sleeve 54.

Thereafter, whenever it is desired to have the collet 12 opened, the machine member 62 will be moved by a mechanism which forms no part of this invention, and will therefore cause the operating arm 59 to be pivoted slightly counterclockwise into its other limit position, during which movement piston 56 will be urged slightly axially inwardly in the bore in sleeve 54. This causes the hydraulic fluid between piston 56 and piston 33 to exert against the inner face of the enlarged-diameter section 34 of the piston 33 a force sufficient to overcome spring 43, so that piston 33, and hence bearing 45 and washer 44, move slightly to the left from the positions illustrated in FIG. 1 relative to housing 32. This leftward movement of washer 44 releases the spring pressure from the left end of the outer spindle 18, which therefore by virtue of the tension in the collet fingers 16 also is caused to be shifted slightly toward the left relative to the inner spindle 10. In so doing, the outer spindle 18 permits the collet 12 to open. Collet 12 then remains open until such time that the machine member 62 permits arm 59 to return to its extreme clockwise 30 position (FIG. 2) about pin 61.

From the foregoing, it will be apparent that the present invention provides a relatively simple and inexpensive means for selectively opening or releasing the chuck collet 12. The hydraulic system employed in this invention is a completely closed loop system, all of the hydraulic fluid being contained between the pistons 33 and 56. In other words, the only outside power required to manipulate the system is the power required to pivot lever 59 between its extreme clockwise and counterclockwise positions. Moreover, since the fluid itself is not compressible, the motion imparted to the piston 56 need only be sufficient to cause the other piston 33 to be shifted slightly axially toward the left in FIG. 1 relative to housing 32. In practice this permits the collet to be opened in less than 0.4 seconds; and this chucking operation can be effected even while the spindles 10 and 18 are rotating. Moreover even though in practice it requires over 2500 psi. to effect the collet opening operation, this pressure is readily provided by the closed loop system afforded by this invention, and which can be produced by a slight movement of the small piston 56.

While this invention has been illustrated and described in detail in connection with only certain embodiments thereof, it will be apparent that it is capable of still further modification, and that this application is intended to cover any such modifications as may fall within the scope of one skilled in the art or the appended claims.

We claim:

1. In a chucking mechanism having an inner, collet supporting spindle, and an outer, tubular spindle disposed coaxially about said inner spindle for rotation therewith about a common axis, and wherein one of said spindles is mounted for axial reciprocation between first and second limit positions relative to the other spindle selectively to open and close a collet chuck which is supported against axial movement on the inner spindle, the improvement comprising resilient means interposed between said spindles,
a fluid pressure cylinder mounted adjacent said resilient means and having therein a fluid pressure chamber,
a first piston reciprocable in a first opening in said cylinder and operatively connected at one end to said resilient means and communicating at its opposite end with said chamber,
a second piston reciprocable in a second opening in said cylinder, and communicating at one end with said chamber and operatively projecting at its opposite end to the exterior of said cylinder, and
an operating member engaging said opposite end of said second piston and mounted externally of said cylinder for movement between first and second limit positions,
said resilient means being operative when said operating member is in its first limit position, resiliently to urge said one spindle into one of its limit positions, and
said operating member being operative upon movement thereof from its first to its second limit position to move said second piston in a direction to cause the fluid in said chamber to force said first piston in a direction to compress said resilient means and permit movement of said one spindle to the other of its two limit positions.

2. In a chucking mechanism having an inner, collet supporting spindle, and an outer, tubular spindle disposed coaxially about said inner spindle for rotation therewith about a common axis, and wherein one of said spindles is mounted for axial reciprocation between first and second limit positions relative to the other spindle selectively to open and close a collet chuck which is supported against axial movement on the inner spindle, the improvement comprising resilient means interposed between said spindles,
a fluid pressure cylinder mounted adjacent said resilient means and having therein a fluid pressure chamber,
a first piston reciprocable in a first opening in said cylinder and operatively connected at one end to said resilient means and communicating at its opposite end with said chamber,
a second piston reciprocable in a second opening in said cylinder, and communicating at one end with said chamber and at its opposite end with the exterior of said cylinder, and
an operating member being pivotally mounted adjacent one end thereof on said cylinder for pivotal movement between first and second limit positions thereof and being in operative engagement adjacent the opposite end thereof with said opposite end of said second piston,
said resilient means being operative when said operating member is in its first limit position, resiliently to urge said one spindle into one of its limit positions,
said operating member being operative upon movement thereof from its first to its second limit position to move said second piston in a direction to cause the fluid in said chamber to force said first piston in a direction to compress said resilient means and permit movement of said one spindle to the other of its two limit positions.

3. In a chucking mechanism having an inner, collet supporting spindle, and an outer, tubular spindle disposed coaxially about said inner spindle for rotation therewith about a common axis, and wherein one of said spindles is mounted for axial reciprocation between first and second limit positions relative to the other spindle selectively to open and close a collet chuck which is supported against axial movement on the inner spindle, the improvement comprising resilient means interposed between said spindles,
a fluid pressure cylinder mounted adjacent said resilient means and having therein a fluid pressure chamber,
a first piston reciprocable in a first opening in said cylinder and operatively connected at one end to said resilient means and communicating at its opposite end with said chamber,
a second piston reciprocable in a second opening in said cylinder, and communicating at one end with said chamber and projecting at its opposite end to the exterior of said cylinder, and
an operating member engaging said opposite end of said second piston and mounted externally of said chamber for movement between first and second limit positions,
said resilient means being operative when said operating member is in its first limit position, resiliently to urge said one spindle into one of its limit positions,
said operating member being operative upon movement thereof from its first to its second limit position to move said second piston in a direction to cause the fluid in said chamber to force said first piston in a direction to compress said resilient means and permit movement of said one spindle to the other of its two limit positions, and
wherein said inner spindle is said other spindle and said outer spindle is said one spindle and said inner spindle is fixed against axial movement and said one limit position of said one spindle is the chuck closing position.

4. In an automatic screw machine having an inner, tubular spindle, an outer, tubular spindle surrounding and reciprocable between first and second limit positions on said inner spindle selectively to open and close a collet chuck on said inner spindle, and a spring interposed between said spindles normally to urge said outer spindle axially into one of its limit positions on said inner spindle, the improvement comprising a cylinder mounted on said outer spindle and having therein a fluid pressure chamber, a pair of pistons mounted to reciprocate in said cylinder, each of said pistons having an inner end opening on said fluid pressure chamber, and an outer end communicating with the exterior of said cylinder, means connecting the outer end of one of said pistons to said spring, and an operating member pivotally mounted at the exterior of said cylinder for movement between first and second limit positions, and being operatively engaging the outer end of the other of said pistons.

said operating member being in one of its two limit positions, when said outer spindle is in said one limit position thereof, and being operative upon movement to its other limit position to urge said other piston in a direction to cause the fluid in said chamber to shift said one piston in a direction to compress said spring and thereby permit movement of said outer spindle from said one to its other limit position thereby to open said chuck.

* * * * *